United States Patent
Carstensen

(10) Patent No.: US 10,334,841 B2
(45) Date of Patent: Jul. 2, 2019

(54) ELECTRICAL DETERRENT SYSTEM FOR REPELLING PINNIPEDS

(71) Applicant: SMITH-ROOT, INC., Vancouver, WA (US)

(72) Inventor: Lee Roy Carstensen, Vancouver, WA (US)

(*) Notice: Subject to any disclaimer, the term of this patent is extended or adjusted under 35 U.S.C. 154(b) by 288 days.

Patent file contains an affidavit/declaration under 37 CFR 1.130(b).

(21) Appl. No.: 15/148,936

(22) Filed: May 6, 2016

(65) Prior Publication Data

US 2016/0324139 A1    Nov. 10, 2016

Related U.S. Application Data

(60) Provisional application No. 62/157,738, filed on May 6, 2015.

(51) Int. Cl.
*A01M 29/24* (2011.01)
*A01M 29/30* (2011.01)
*E04B 1/72* (2006.01)

(52) U.S. Cl.
CPC .................................. *A01M 29/24* (2013.01)

(58) Field of Classification Search
CPC . A01M 29/24; H05C 1/06; H05C 1/04; F41H 13/0018; A01K 15/02; A01K 15/029; A01K 79/02; F41B 15/04
See application file for complete search history.

(56) References Cited

U.S. PATENT DOCUMENTS

| | | | | |
|---|---|---|---|---|
| 3,392,247 A * | 7/1968 | Check | ...................... | G08G 1/02 200/86 R |
| 4,949,216 A * | 8/1990 | Djukastein | ............... | H05C 1/04 361/232 |
| 4,969,418 A * | 11/1990 | Jones | ................... | A01K 15/023 119/712 |
| 5,289,133 A * | 2/1994 | Kolz | ...................... | G01R 21/00 324/439 |
| 5,460,123 A * | 10/1995 | Kolz | ...................... | A01K 79/02 119/220 |

(Continued)

FOREIGN PATENT DOCUMENTS

| | | |
|---|---|---|
| CA | 2821050 A1 | 1/2014 |
| DE | 202006003419 U1 | 11/2006 |
| WO | WO 2009133276 A2 | 11/2009 |

OTHER PUBLICATIONS

Burger "Innovative Technology for Deterrence of Marine Mammals with Non-Lethal Electric Gradients: Update on Field Trial Results". Retrieved from the Internet: <URL http://pccharbormasters.org/wp-content/uploads/2016/10/PCCH2b.pdf>.*

(Continued)

*Primary Examiner* — Thienvu V Tran
*Assistant Examiner* — Nicolas Bellido
(74) *Attorney, Agent, or Firm* — J. Curtis Edmondson; Law Offices of J. Curtis Edmondson

(57) ABSTRACT

An electrical deterrent system including a pulse generator, power source, and substrates with accompanying electrodes for attaching to different types of surfaces and supports on various manufactured structures to repel pinnipeds from a manufactured or man-made structure that otherwise is not intended for pinniped use.

16 Claims, 8 Drawing Sheets

(56) References Cited

U.S. PATENT DOCUMENTS

| | | | |
|---|---|---|---|
| 5,566,643 | A | 10/1996 | Charter et al. |
| 6,357,390 | B1 * | 3/2002 | Maehata .................. H05C 1/04 |
| | | | 119/220 |
| 6,388,949 | B1 | 5/2002 | Lenhardt et al. |
| 6,791,816 | B2 * | 9/2004 | Stethem .............. F21V 33/0076 |
| | | | 231/7 |
| 7,174,668 | B2 | 2/2007 | Loclklear |
| 7,191,735 | B2 * | 3/2007 | Wolfgram .............. A01K 3/005 |
| | | | 119/712 |
| 7,275,502 | B2 * | 10/2007 | Boyd ................... A01K 1/0353 |
| | | | 119/721 |
| 7,470,086 | B2 | 12/2008 | Jennings et al. |
| 7,924,165 | B2 | 4/2011 | Vinano et al. |
| 8,289,812 | B2 | 10/2012 | Gotx et al. |
| 2005/0150469 | A1 * | 7/2005 | Wolfgram .............. A01K 3/005 |
| | | | 119/712 |
| 2010/0224134 | A1 * | 9/2010 | Burger ................... A01K 79/02 |
| | | | 119/220 |
| 2010/0242851 | A1 * | 9/2010 | Carstensen ............ A01K 71/00 |
| | | | 119/220 |
| 2011/0176391 | A1 | 7/2011 | DeLaCroix et al. |
| 2012/0305386 | A1 | 12/2012 | Schutt |
| 2013/0139761 | A1 | 6/2013 | Nedwell |
| 2014/0070977 | A1 | 3/2014 | Stocke, Jr. |
| 2014/0205381 | A1 | 7/2014 | McClure |

OTHER PUBLICATIONS (Lowes [online]. pdf.lowes.com [retrieved on Sep. 14, 2011]. Retrieved from the Internet: <URL: http://pdf.lowes.com/useandcareguides/840213068127_use.pdf>.*

Burger "Innovative Technology for Deterrence of Marine Mammals with Non-Lethal Electric Gradients: Update on Field Trial Results". Retrieved from the Internet: <URL http://pccharbormasters.org/wp-content/uploads/2016/10/PCCH2b.pdf>. (Year: 2016).*

(Lowes [online]. pdf.lowes.com [retrieved on Sep. 14, 2011]. Retrieved from the Internet: <URL: http://pdf.lowes.com/useandcareguides/840213068127_use.pdf>. (Year: 2011).*

* cited by examiner

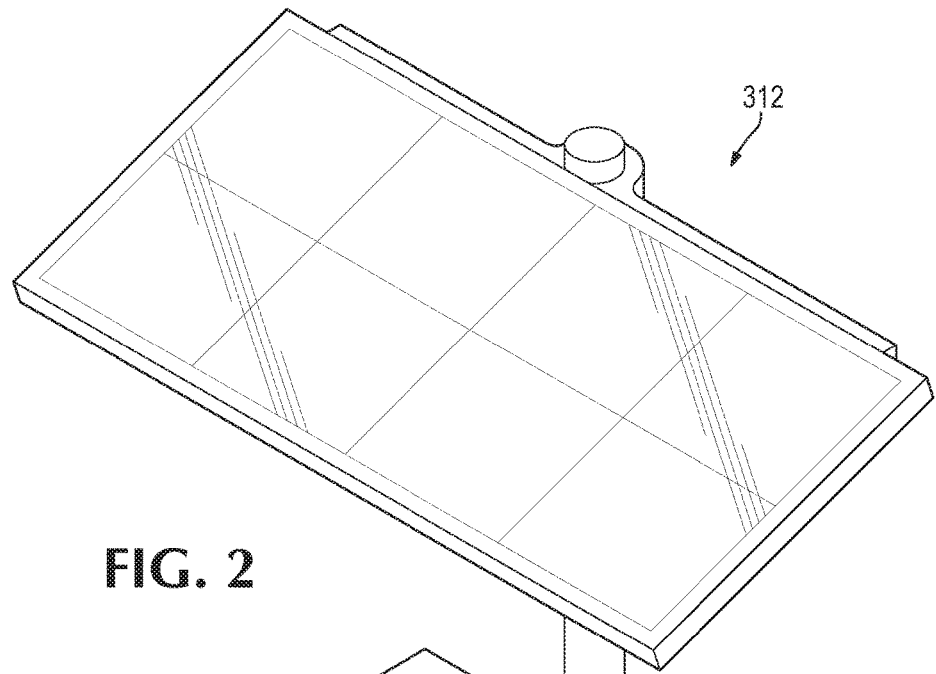
FIG. 2
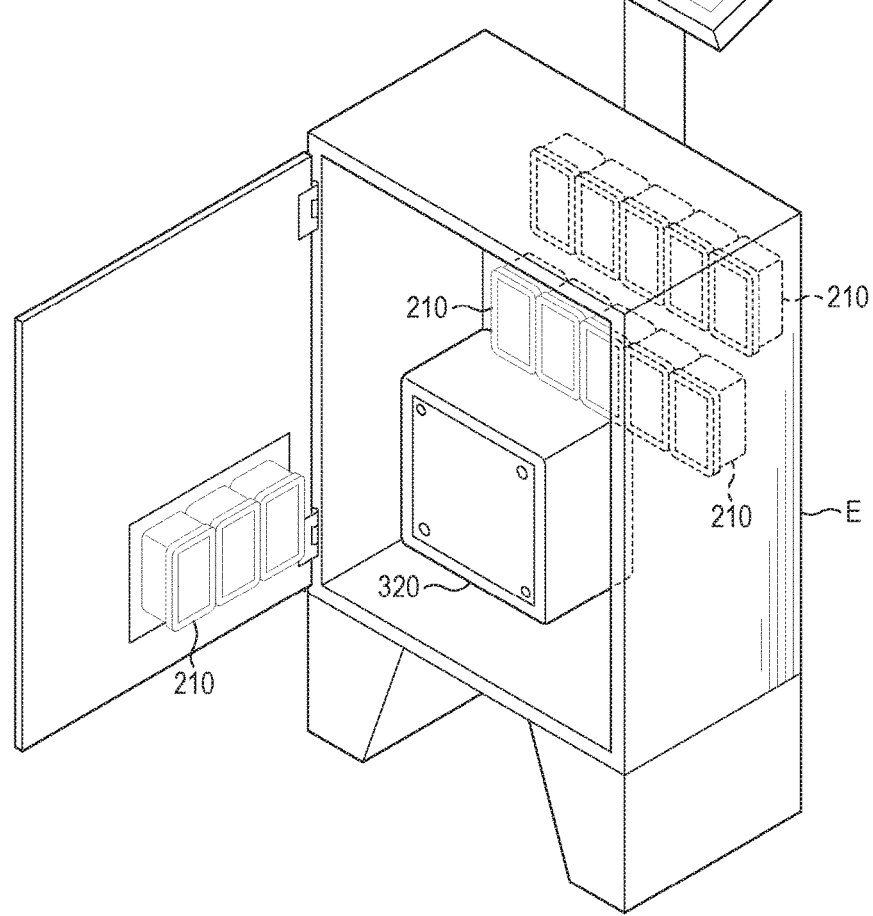

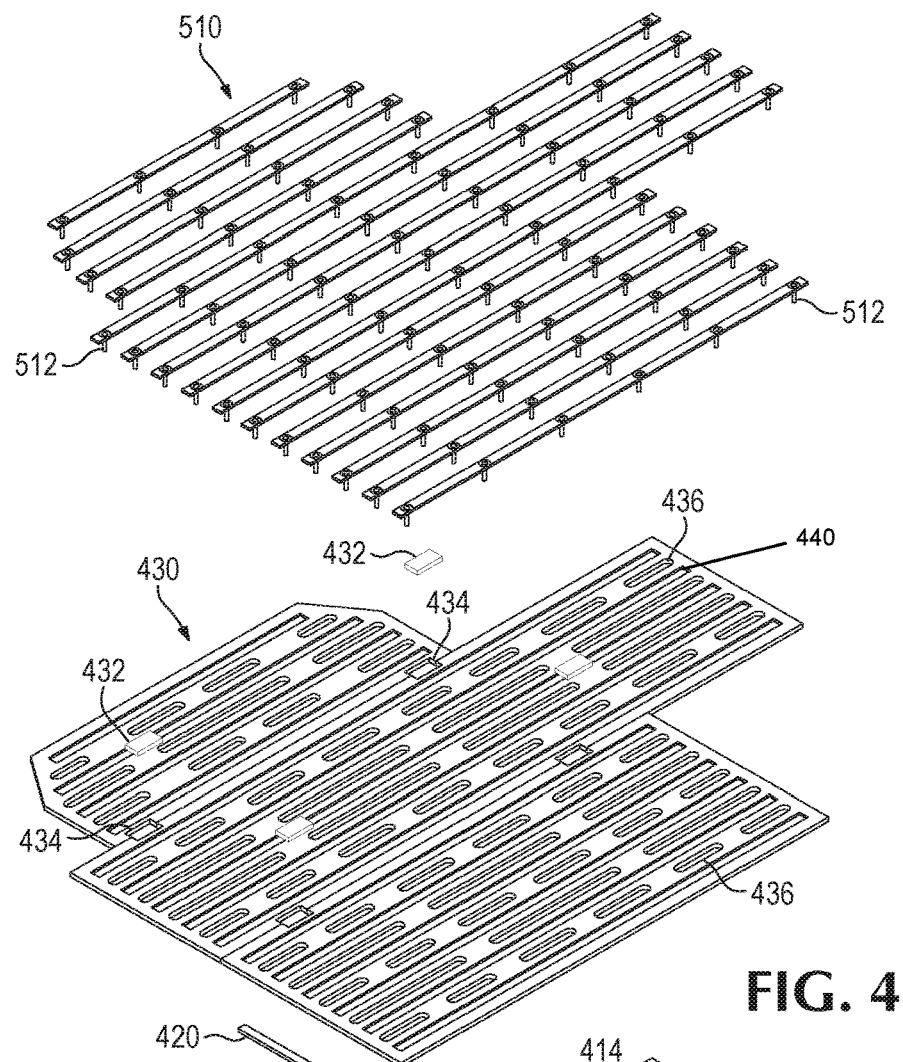
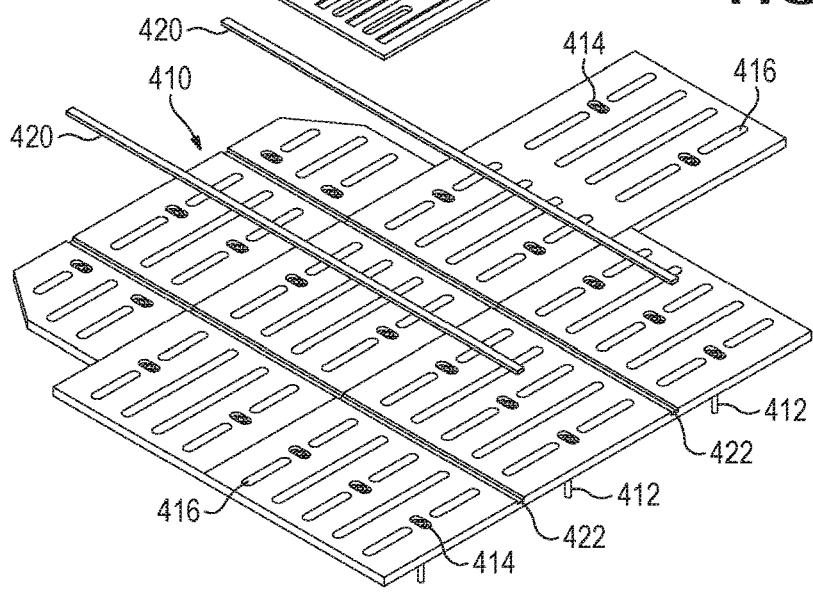
FIG. 4

ELECTRICAL DETERRENT SYSTEM FOR REPELLING PINNIPEDS

CROSS REFERENCE TO RELATED APPLICATIONS

This application claims the benefit of U.S. Provisional Patent Application No. 62/157,738 filed May 6, 2015, which is incorporated herein by reference in its entirety.

BACKGROUND

1. Field of the Invention

This disclosure relates generally to embodiments for marine mammal deterrence, and more particularly to embodiments to repel, but not injure, pinnipeds from manufactured or artificial haulout sites.

2. Description of the Related Art

Pinnipeds, in general, use hundreds of sites to rest or haulout along coastal and inland waters, including intertidal sand bars and mudflats in estuaries, intertidal rocks and reefs, sandy, cobble, and rocky beaches, islands, log booms, docks, and floats in all marine areas. Group sizes typically range from small numbers of animals on some intertidal rocks to several thousand animals found seasonally in coastal estuaries. Naturally, some of the haulout sites are used by the animals as rookeries, nurseries, and/or both. Still, pinnipeds are at times using manufactured structures, such as navigation buoys, jetties, log booms, marina docks and wharfs, floats and bumpers, and boat landings as haulout sites that would not otherwise exist without human manufacturing.

On land, pinniped alarm reactions are known to consist of a frantic dash for the water, even if this involves leaping off a high cliff onto a rocky beach below. The alarm is highly contagious, and usually spreads rapidly through an aggregation. If the reaction is low intensity, several animals will simultaneously rear up and look about and then gradually retreat from the direction of the disturbance, or if the disturbance is more obvious, they will rush to the water's edge before stopping to look about. Sometimes hundreds of animals stampede into the water without pausing to identify the source of their disturbance. After they enter the water, they typically begin barking, form rafts, and swim back toward the shore with heads held high from the water as though trying to observe the cause of the alarm.

In the water, known pinniped deterrent technologies that repel, but do not injure the animals implement and utilize acoustic, electrical, optical, and electromagnetic devices. These devices are meant to be used under water or while the animals are in the water.

As more and more man-made structures become unintended haulout sites, there is need for a pinniped deterrent that effectively and without permanent injury, causes the animals to exit and/or dismount the structure and is associated with an aversive stimulus with which the animals cannot become easily habituated.

SUMMARY

The present disclosure is directed to an electrical deterrent system for repelling pinnipeds from a manufactured or man-made structure that otherwise is not intended for pinniped use. The system is repeatable, controllable and scalable and includes docking type interchangeable sections, which, for example, are positioned on a boat landing of a commercial use, offshore marine platform. In some embodiments the deterrent system includes rolled, matting type interchangeable sections, which, for example, are positioned on beams and pipes of the offshore marine platform. In other embodiments the deterrent system can be mobilized and positioned on the surface of a floating structure. In still other embodiments, the deterrent can be permanently positioned and integrated into concrete, recycled-wood composite, open celled fiberglass free draining surfaces.

It should be understood that the summary above is provided to introduce in simplified form a selection of examples that are further described in the detailed description. It is not meant to identify key or essential features of any claimed subject matter that may later claim priority to the present description. Furthermore, the scope of any such claimed subject matter would not be limited to implementations that solve any disadvantages noted above or herein contained.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is an isometric view of a power source, according to an exemplary embodiment.

FIG. 4 is an exploded view of the substrate and electrodes shown in FIG. 3, according to an exemplary embodiment.

DETAILED DESCRIPTION

The term pinniped shall mean a semi-aquatic carnivorous genus of marine mammals having limbs modified to be flippers. The infraorder, Pinnipedia includes commonnamed seals, walruses, and sea lions.

The term deterrent is taken to mean to cause a pinniped to dismount from or to discourage a pinniped from entering and reentering onto a manufactured structure. The deterrent is capable of providing an electrical stimulus which produces a feeling of unease, but does not cause a wild alarm reaction which could result in injury.

The term manufactured structure(s) shall mean artificial haulout sites, such as, but not limited to, navigation buoys; jetties; log booms; marina docks and wharfs; boat platforms; floats; and landing docks, bumpers, support beams, pipes, and braces that are constructed as part of or forming offshore marine platforms. Due to the artificial essences and characteristics of these sites, use of the sites by the pinnipeds is independent of tidal levels.

The term offshore marine platform(s) shall mean a commercial use structure employed in the drilling and production of oil and gas.

The term haulout shall mean the pinniped(s) temporarily leaving the water between periods of foraging activity for a relocation on various surfaces of manufactured structures, as the term pertains to the present disclosure.

Non-limiting embodiments will now be described in detail, by way of example, with reference to the drawings.

Figure 1:
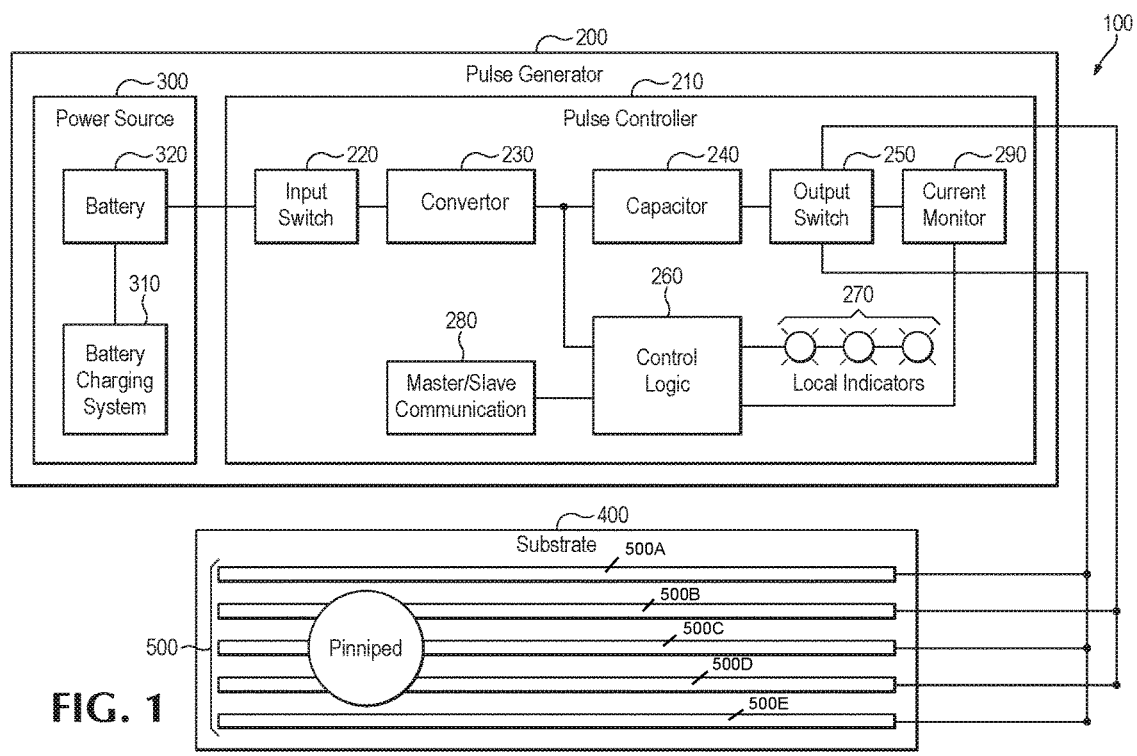
FIG. 1 is a schematic diagram showing a deterrent system, according to an exemplary embodiment.

Turning to the drawings, where like reference numerals represent like parts throughout the various drawing figures, FIG. 1 is directed to a non-limiting embodiment of a pinniped deterrent system 100. The system 100 includes a pulse generator 200, power source 300, and substrates 400 with accompanying electrodes 500 for attaching to different types of surfaces and supports on various manufactured structures (not shown). The pulse generator 200 includes a pulse controller 210 that is configured to transmit a low voltage non-lethal, pulsed current into the pinniped's (not shown) damp or wet skin tissue when the pinniped makes contact with the electrodes 500. The electrodes 500 are patterned to conform to various surfaces of the manufactured structures by way of assembled substrates 400.

As FIG. 1 illustrates, the pulse generator 200 includes a pulse controller 210 and a power source 300. The pulse controller 210 employs discrete gate or transistor logic to yield a pulsating or alternating waveform (not shown). In FIG. 1, the DC power is transmitted from the battery 320 to input switch 220 to provide power switching, over-current and polarity protection. Next, converter 230 is a DC to DC converter which boosts the power source 300 voltage to 24 volts and charges the capacitor 240 for energy source. Any suitable converter 230 that generates an oscillating waveform of a frequency determined by passive components, such as resistors and capacitors, or inductors may be used. The control logic 260 synchronizes the charging and discharging of the capacitor 240 to control pulse frequency, width, polarity, and peak current. Further included are output switches 250, local indicators 270, master/slave communication 280, and current monitor 290. Master/slave communication 280 is needed when multiple pulse controllers are used together to synchronize operation.

The pulse controller 210 creates a pulsed DC difference voltage between adjacent electrodes 500A/500B, 500B/500C, 500C/500D and 500D/500E of an electrode setup 500. The adjacent electrodes (500A/500B, 500B/500C, 500C/500D and 500D/500E) have opposite polarity and the alternate electrodes (500A/500C, 500C/500E and 500B/500D) have same polarity. The pulses are spaced apart, which is known to work as an aversive irritant to pinnipeds, causing them to dismount from the electrified surface of the manufactured structure. The pulse duration can be adjusted between about 100 and about 300 microseconds and control logic 260 is designed to stop the cycle the instant the current exceeds 5 Amps.

It should be understood that an electrically erasable programmable read-only memory (EEPROM) and a PIC-based microcontroller unit along with shift registers (not shown) could be implemented with the present embodiments, in order to execute instructions from the firmware stored in the EEPROM, and in order to clock the output pulse timing to the output switches 250 of pulse generator 200.

The EEPROM may provide memory storage for a data logging function (not shown). The data logging function can be used to record durations, amplitude outputs, and other information and the EEPROM could be queried for the data.

Other non-limiting configurations of the pulse generator 200 and firmware may also be employed by the present embodiments. Still further the pulse generator's 200 components may be further implemented or performed with a general purpose processor, a digital signal processor (DSP), an application specific integrated circuit (ASIC), a field programmable gate array (FPGA) with internal flash memory, or other programmable logic device and any combination thereof designed to perform the functions herein.

With continuing reference to FIG. 1, power source 300 includes a battery charging system 310 and a battery 320. The battery charging system 310 can be various sources of energy to yield DC power including, by way of example, solar, wind, wave, and rectified AC power sources. An array of solar cells mounted to adjustable panels (See FIG. 2, 312) is used in some embodiments and will be further described below. Battery 320 is a 110 A, 12V battery or similar battery. An example of such a battery is 110 A, 12V AGM battery manufactured by Fullriver. Those of skill in the art will appreciate that any suitable battery 320 alternative and various number of batteries in series (not shown) are contemplated as being within the spirit and scope of the invention. Other non-limiting configurations of the power source 300 may also be employed by the present embodiments.

Referring to FIG. 2 and with continuing reference to FIG. 1, in some embodiments, deterrent system 100 includes solar panel 312. In a non-limiting embodiment, solar panel 312 of FIG. 2 is any industry-available panel, having a length, by way of example, to about 49 inches and width of about 28½ inches. The size of the panel 312, itself is not limited by the number and size of individual solar cells that form the panel 312. It should be understood that different lengths and widths are contemplated while different dimensioned individual and multiple sets of strategically positioned panels 312 to form a large solar array may be necessary to compensate for various dimensions of the areas to be energized. As illustrated in FIG. 2, solar panel 312 can be adjustably positioned, by way of example, above a pulse generator 200 enclosure E to provide a conveniently accessible, but still scalable unit enclosing multiple pulse controllers 210 patterned in a series, and battery 320. Inside enclosure E, the pulse controllers 210 and battery 320 are protected from the elements and are easily accessible. Further for the sake of convenience and protection, it is contemplated that pulse controller 210 could be configured in a separate enclosure or energizer box (See FIG. 2, 210) and further compartmentalized within enclosure E. It should be understood by persons of ordinary skill in the art that enclosure E is constructed from any suitable material that is durable and strong with an environmental rating for offshore marine platforms or other types of manufactured structures. Such materials include, by way of example, stainless steel, galvanized steel, aluminum, and blends thereof.

Figure 3:
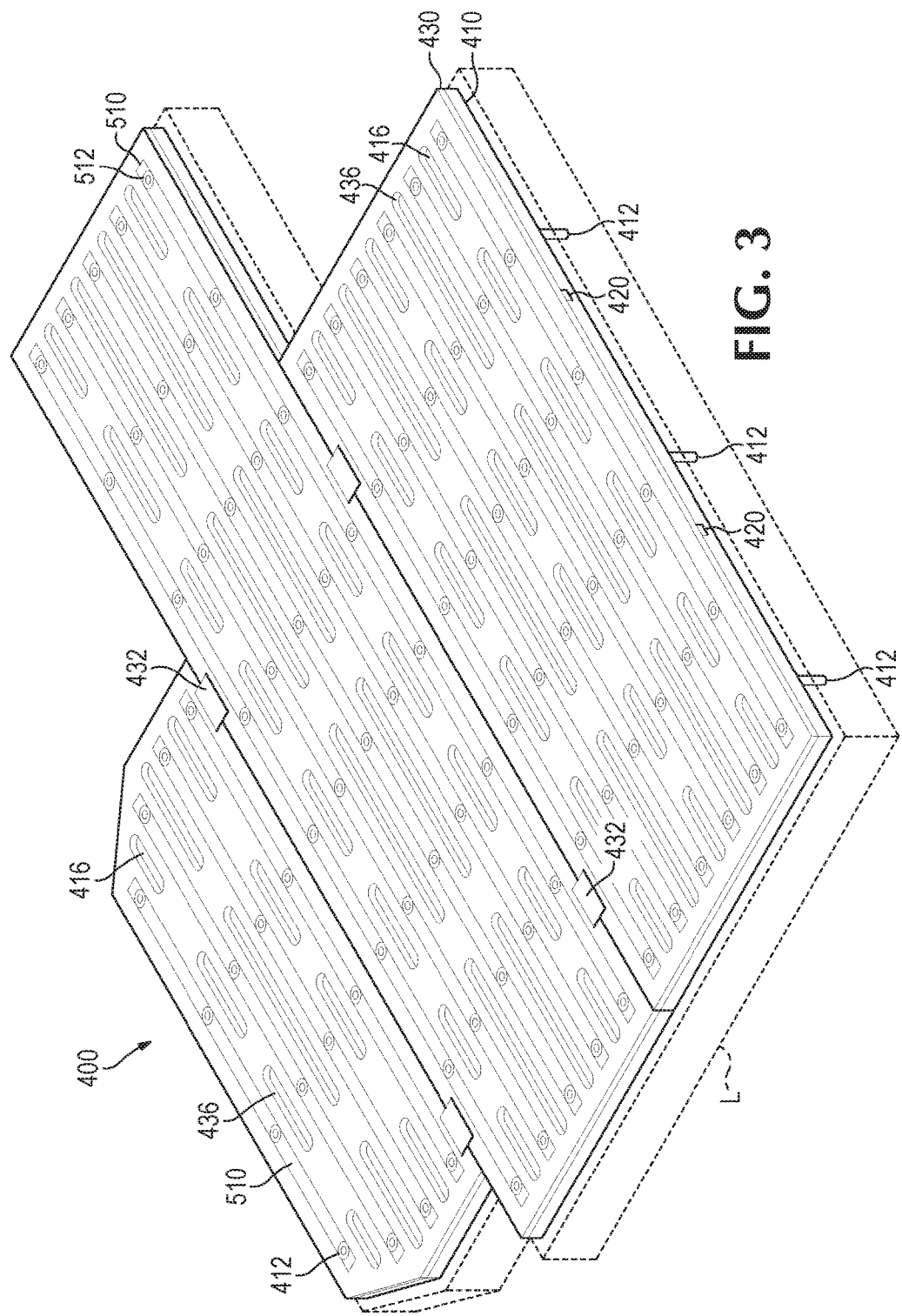
FIG. 3 is an isometric view of a substrate and electrodes, according to an exemplary embodiment.

Turning to FIG. 3, an example substrate 400 is illustrated according to embodiments of the present disclosure. In FIG. 3, a docking-type substrate 400 is shown. In some embodiments, substrate 400 is adapted to be securely fastened to the top surface of a boat landing or platform L, for example, or other grating surfaces used in manufactured structures. In FIG. 3, substrate 400 includes a lower layer 410, busbar platforms 420, upper layer 430, electrode receiving slots 440 (See FIG. 4), and docking substrate electrodes 510.

Referring to FIG. 4 and with continuing reference to FIG. 3, lower layer 410 and upper layer 430 are made of non-conductive, plastic material, suitable for mounting to the top surface used for the landing L. Those of skill in the art will appreciate that any suitable material alternative is contemplated as being within the spirit and scope of the invention. Furthermore, depending on what type of surface the substrate will be mounted atop of, other materials, by way of example, that are contemplated include recycled-wood composite and fiberglass.

As shown in FIGS. 3 and 4, the lower layer 410 is fastened and secured to the landing's L grating, using cap screw 412 and swivel nut (not shown). The cap screws 412 are received in the cap screw receiving holes 414. Those of skill in the art will appreciate that any suitable fastener alternative is contemplated as being within the spirit and scope of the invention.

Still referring to FIGS. 3 and 4, a pattern of drainage holes 416 are provided to limit short-circuits and allow tidal waters and wave crashes, as well as rain or condensation to easily drain away from the conductive path between the closely spaced plastic sections. Next, busbar platforms 420 are positioned in the busbar platform slots 422 that are formed in the lower layer 410. Upper layer 430 is secured to lower layer 410 via bridges 432 that are secured in bridge receiving holes 434. Further, drainage holes 436 of the upper layer 430 are patterned to align with lower layer 410 drainage holes 416. Docking substrate electrodes 510 are secured to the upper layer 430 in the electrode receiving slots 440 of the upper layer 430. Bus contacts 512 of the docking substrate electrodes 510 form an electrical contact with the associated busbar platforms 420, which are patterned in a transverse design with the perpendicularly positioned electrodes 510. The electrodes 510 are evenly spaced apart to form patterns of conductive and non-conductive regions on the substrate 400.

As illustrated in FIGS. 3 and 4, the spacing of the electrodes 510 and the number of electrodes 510, by way of example and depending on the size of the surface area to be energized, can be spaced apart to form an odd number of electrodes 510, such that the adjacent electrodes have opposite polarity and the alternate electrodes have same polarity. For example, in FIGS. 3 and 4, in a non-limiting embodiment, there can be about three sections of modular docking substrate 400, each connected to cover a designated surface area, such as the surface of a boat landing L on a manufactured structure. The skilled artisan will understand that patterning the docking-type substrate 400 in an odd number (15 electrodes in FIGS. 3 and 4) of electrodes 510 across the surface area of the landing L will form a complete circuit (See FIG. 1) when the pinniped having wet skin contacts the electrodes. Thus, with a complete circuit, the aversive pulses of the deterrent system 100 are not dependent on the number of pinniped and their individual sizes. The system 100 is designed to orient and pattern the docking substrate 400 with the electrodes 510 in a fashion that targets any or all pinnipeds who have performed a haul out onto the manufactured structure.

With reference to the electrical connections (not shown) between the electrodes 500 (generally) and pulse generator 200, bundled cable wires (not shown) can be used. It should be understood that a wireless configuration is contemplated by the embodiments disclosed. In addition, a wireless configuration is contemplated to support a deterrent system for a buoy (not shown) or other floating structures that pinnipeds use for haulout sites.

Figure 5:
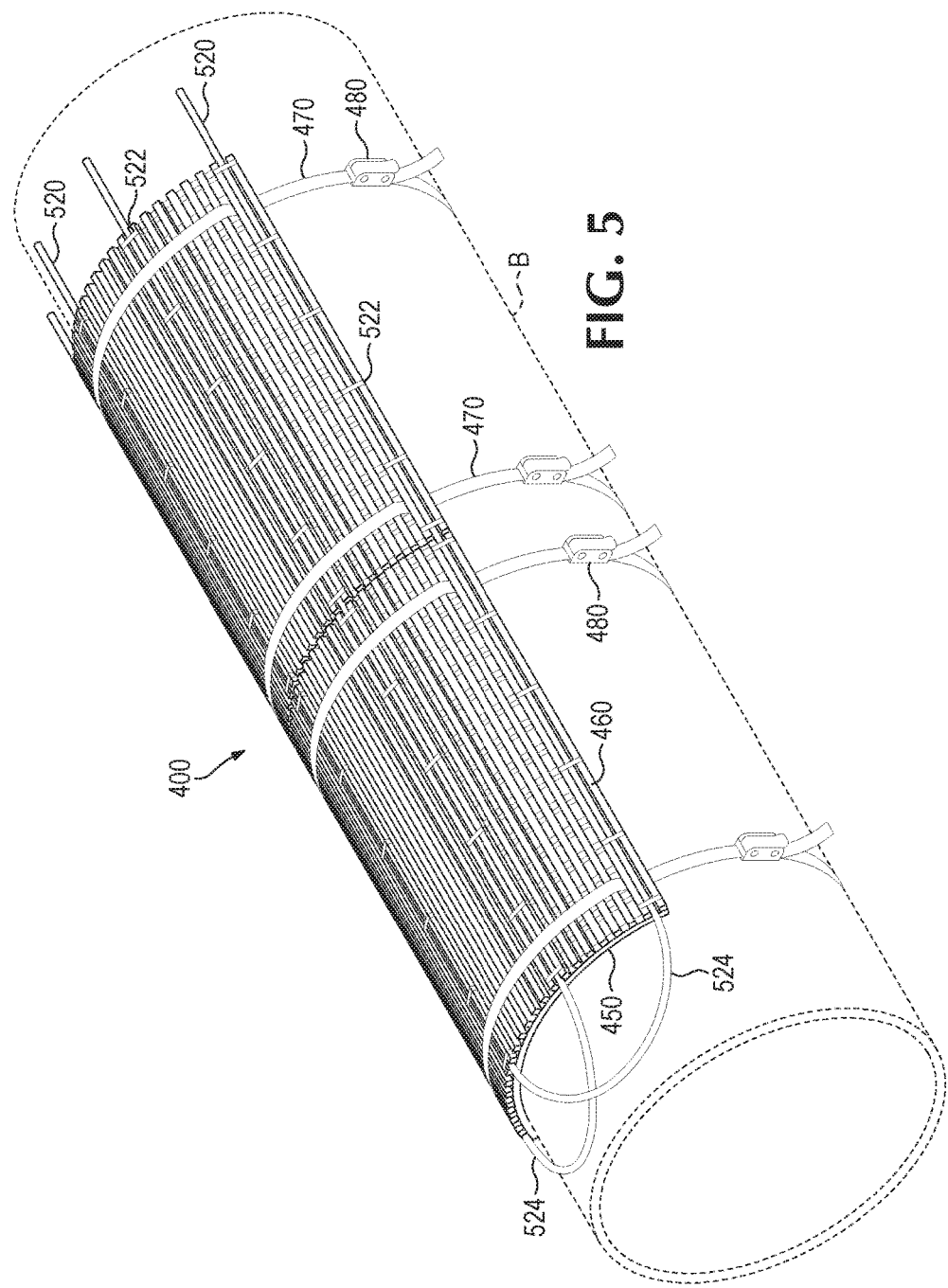
FIG. 5 is an isometric view of a substrate and electrodes, according to an exemplary embodiment.

Turning to FIG. 5, in some embodiments, another type of substrate 400 can be implemented for manufactured structure surfaces having a radius for those surfaces that are otherwise not substantially flat. As illustrated in FIG. 5, a beam B such as a support beam, pipe, or brace is shown as an example of another type of surface providing a haulout site on offshore marine platforms. The matting-type substrate 400 includes a lower layer 450, an upper layer 460, straps 470, ratchet buckles 480 for the straps 470, wire rope electrodes 520, rope electrode buckles 522, and insulation carry loops 524.

Figure 6:
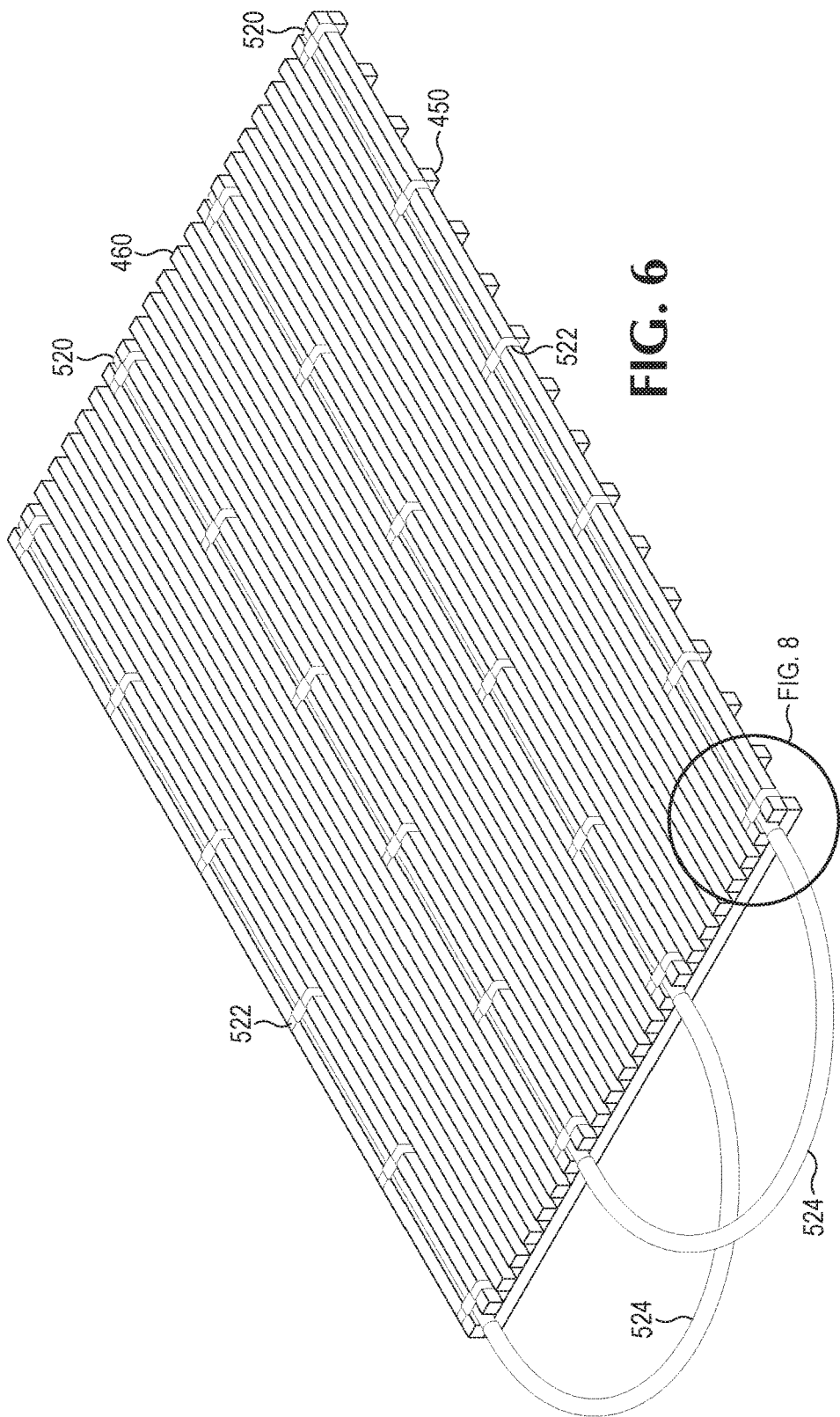
FIG. 6 is a top-side, perspective view of the substrate and electrodes shown in FIG. 5, according to an exemplary embodiment.
Figure 7:
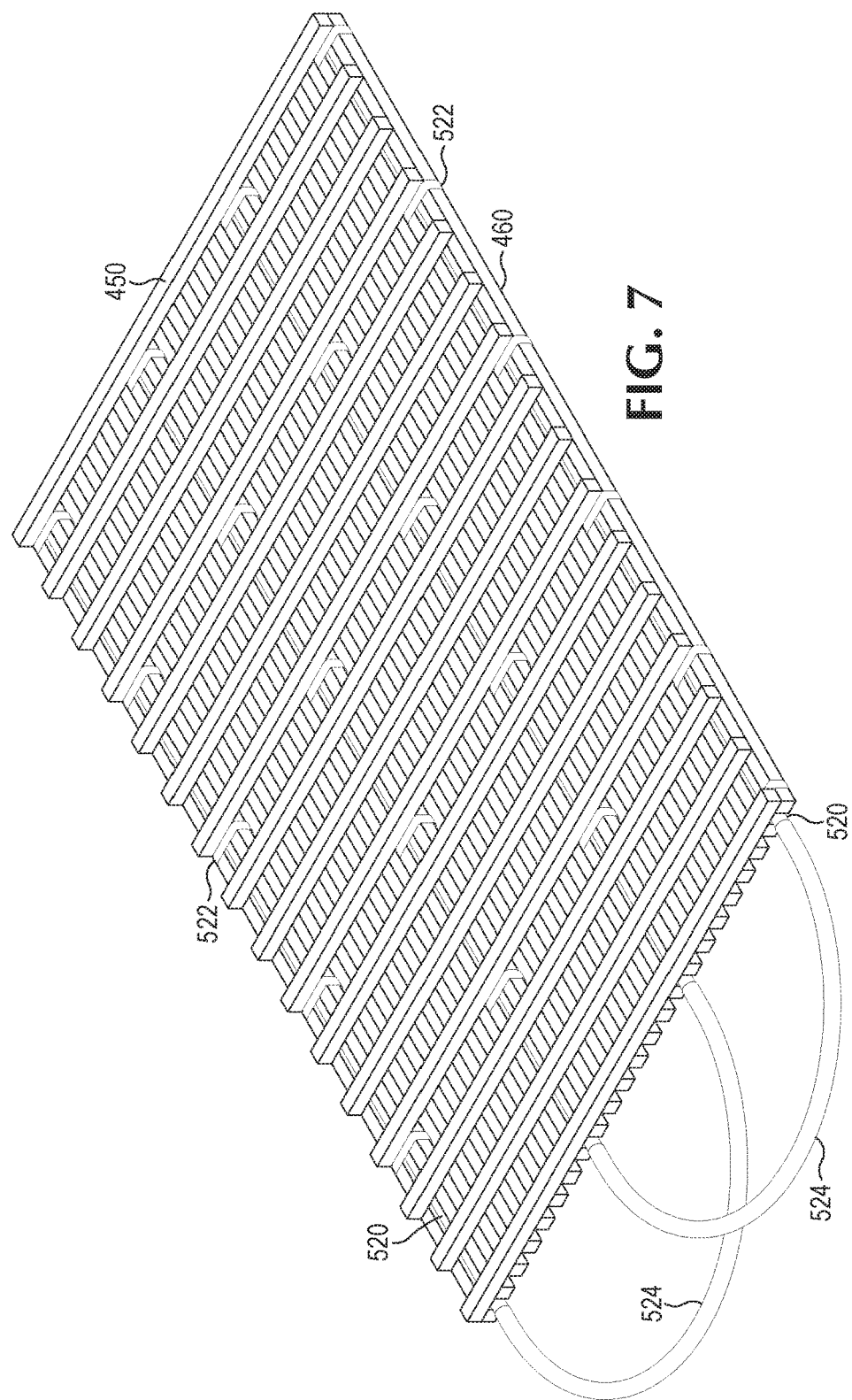
FIG. 7 is a bottom-side, perspective view of the example substrate and electrodes shown in FIGS. 5 and 6, according to an exemplary embodiment.

Referring to FIGS. 6 and 7 and with continuing reference to FIG. 5, lower layer 450 and upper layer 460 are made of non-conductive, flexible, plasticized material. An example of such material is polyvinyl chloride fashioned in a duckboard design and manufactured by Plastic Extruders, Ltd., Russell Gardens, Wickford, Essex, SS11 8DN, England. The material should be available in rolls for ease of installation, and it should be easy to cut to size and shape. Those of skill in the art will appreciate that any suitable material alternative with the foregoing characteristics is contemplated as being within the spirit and scope of the invention.

Figure 8:
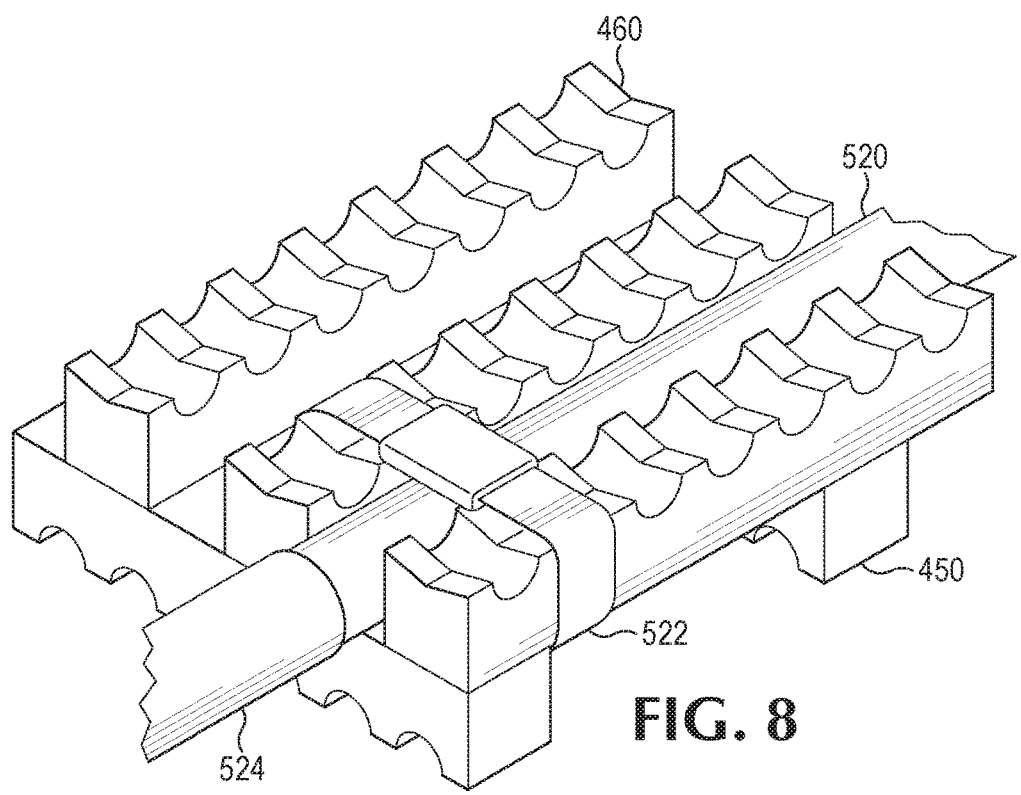
FIG. 8 is a top-side, perspective view of the encircled portion of FIG. 5, according to an exemplary embodiment.

The matting-type substrate's 400 duckboard design limits short-circuits and allow tidal waters and wave crashes, as well as rain or condensation to easily drain away from the conductive path between the closely spaced polyvinyl chloride sections, as shown in FIG. 8. By way of example, wire rope electrodes 520 are positioned between upper layer 460 strands and secured in place with rope electrode buckles 522. The electrodes 520 are evenly spaced apart to form patterns of conductive and non-conductive regions on the substrate 400. Additionally, the wire rope electrodes 520 terminate on one end in an alternating fashion forming coils. The coils can be covered to provide an insulation carry loop 524 for ease of handling.

Referring back to FIG. 5, lower layer 450 is placed and conformed atop a curved surface B. Straps 470 are, by way of example, non-conductive straps that will be easily interwoven between the upper layer 460 and lower layer 450. The substrate 400 can be fastened to the beam B with the straps 470 and ratchet buckles 480. Those of skill in the art will appreciate that any suitable fastener alternative is contemplated as being within the spirit and scope of the invention.

Those of skill in the art will appreciate, as a temporary deterrent system used on demand, that substrate 400 shown in FIGS. 5-8 can be used on substantially flat surfaces, including boat landings, grated surfaces, marina docks, and wharfs by way of rolling out the matting-type substrate 400 on top of the flat surface, securing the substrate 400 with suitable strapping and/or fasteners (not shown), then removing the substrate 400 by rolling the substrate 400 up.

From the foregoing description it will be apparent that modifications can be made to the pinniped deterrent system 100 without departing from the teachings of the invention.

The instant invention may be embodied in other forms or carried out in other ways without departing from the spirit or essential characteristics thereof. The present disclosure is therefore to be considered as in all respects illustrative and not restrictive, the scope of the invention being indicated by the appended claims, and all equivalency are intended to be embraced therein. One of ordinary skill in the art would be able to recognize equivalent embodiments of the instant invention and be able to practice such embodiments using the teaching of the instant disclosure and only routine experimentation.

What is claimed is:

1. An electrical deterrent system to repel pinnipeds from structures, comprising:
   an elongated non-conductive substrate element having a top surface, the substrate element configured to conform to a planar or rounded surface of the structures;
   a plurality of electrodes attached to or adapted to be integrated within the top surface of the substrate element, the electrodes are configured to deliver an electric current to damp or wet skin of the pinnipeds;
a pulse controller in electrical communication with the electrodes, the pulse controller configured to direct delivery of the electric current to the electrodes as an aversive irritant for causing the pinnipeds to dismount from the surface of the structures;
a power source in electrical communication with a pulse generator;
a lower layer;
an upper layer forming the top surface of the substrate element, wherein the upper layer is fashioned in a duckboard to allow tidal waters, wave crashes, rain water, and condensation to drain away;
one or more straps;
one or more ratchet buckles;
one or more electrode buckles; and,
one or more non-conductive carry loops.

2. The electrical deterrent system of claim 1, wherein the pulse controller creates a pulsed DC difference voltage between adjacent electrodes.

3. The electrical deterrent system of claim 1, wherein a pulse duration can be adjusted between 100 and 300 microseconds.

4. The electrical deterrent system of claim 1, wherein the power source is solar energy.

5. The electrical deterrent system of claim 1, wherein the power source includes a battery charging system and a battery.

6. The substrate element of the electrical deterrent system of claim 1, further comprising:
busbar platforms; and
electrode receiving slots.

7. The electrical deterrent system of claim 6, wherein the electrodes are evenly spaced apart to form patterns of conductive and non-conductive regions on the surface of the substrate element.

8. The electrical deterrent system of claim 1, wherein the electrodes are rope electrodes positioned between a plurality of strands of the upper layer.

9. The electrical deterrent system of claim 8, wherein the substrate element is available in rolls for installation and removal.

10. An electrical deterrent system to repel pinnipeds from structures, comprising:
an elongated non-conductive substrate element having a top surface, the substrate element configured to conform to a planar surface of the structures, the substrate element further comprising:
a lower layer;
busbar platforms;
an upper layer forming the top surface of the substrate element, wherein the upper layer is fashioned in a duckboard to allow tidal waters, wave crashes, rain water, and condensation to drain away;
electrode receiving slots; and,
drainage holes to allow tidal waters, wave crashes, rain water, and condensation to drain away;
a plurality of electrodes each received by the electrode receiving slots and fastened through the lower layer, the electrodes are configured to deliver an electric current to damp or wet skin of the pinnipeds;
a pulse controller in electrical communication with the electrodes, the pulse controller configured to direct delivery of the electric current to the electrodes as an aversive irritant causing the pinnipeds to dismount from the surface of the structures, wherein the pulse controller creates a pulsed DC difference voltage between adjacent electrodes; and
a power source in electrical communication with a pulse generator.

11. The electrical deterrent system of claim 10, wherein a pulse duration can be adjusted between 100 and 300 microseconds.

12. The electrical deterrent system of claim 10, wherein the electrodes are evenly spaced apart to form patterns of conductive and non-conductive regions on the surface of the substrate element.

13. An electrical deterrent system to repel pinnipeds from structures, comprising:
a flexible elongated non-conductive substrate element having a top surface, the substrate element configured to conform to a planar or rounded surface of the structures, the substrate element further comprising:
a lower layer; and,
an upper layer forming the top surface of the substrate element; wherein the upper layer is fashioned in a duckboard to allow tidal waters, wave crashes, rain water, and condensation to drain away;
a plurality of electrodes attached to or adapted to be integrated within the top surface of the substrate element, the electrodes are configured to deliver an electric current to damp or wet skin of the pinnipeds;
a pulse controller in electrical communication with the electrodes, the pulse controller configured to direct delivery of the electric current to the electrodes as an aversive irritant causing the pinnipeds to dismount from the surface of the structures, wherein the pulse controller creates a pulsed DC difference voltage between adjacent electrodes; and
a power source in electrical communication with a pulse generator.

14. The electrical deterrent system of claim 13, wherein a pulse duration can be adjusted between 100 and 300 microseconds.

15. The electrical deterrent system of claim 13, wherein the electrodes are rope electrodes positioned between a plurality of strands of the upper layer.

16. The electrical deterrent system of claim 13, wherein the substrate element is available in rolls for installation and removal.

* * * * *